April 1, 1947.   C. F. VOYTECH   2,418,378
TRANSMISSION
Filed Oct. 14, 1943
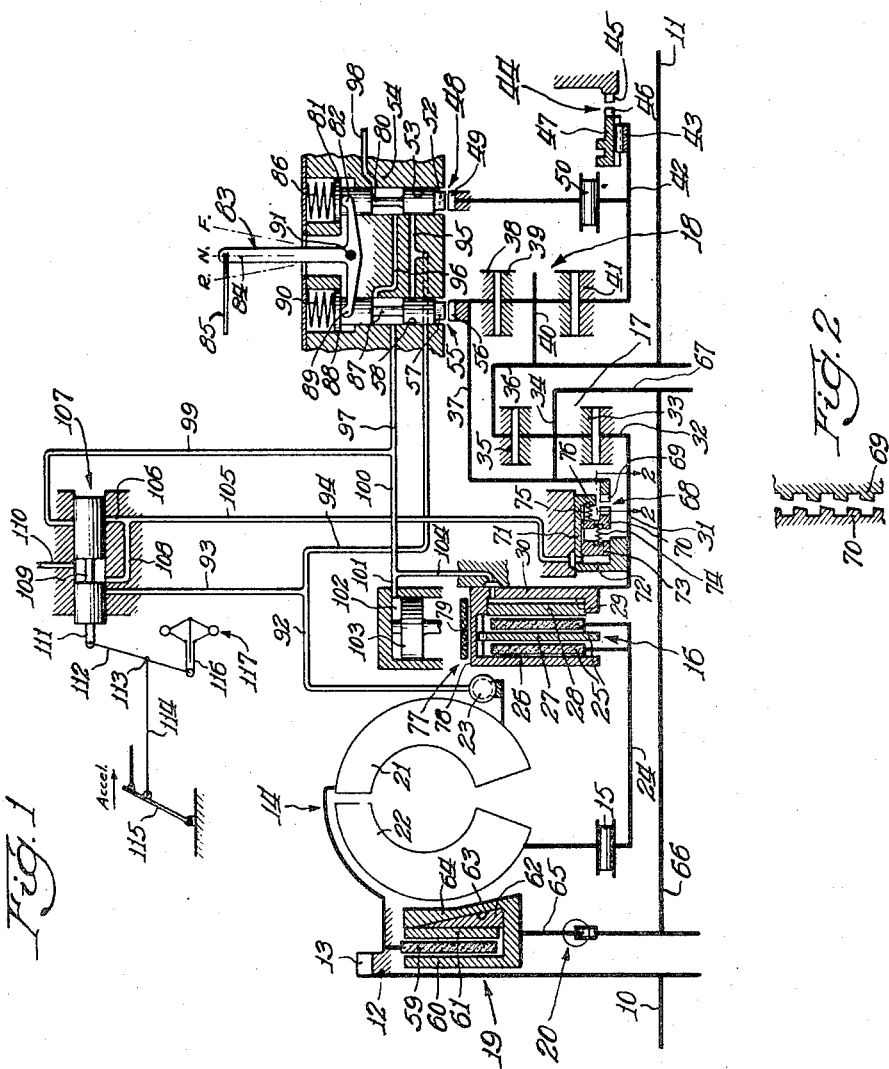
Inventor:
Charles F. Voytech
By Edward C. Fitzbaugh
Atty.

Patented Apr. 1, 1947

2,418,378

UNITED STATES PATENT OFFICE 2,418,378

TRANSMISSION

Charles F. Voytech, Chicago, Ill., assignor to Borg-Warner Corporation, Chicago, Ill., a corporation of Illinois Application October 14, 1943, Serial No. 506,124

23 Claims. (Cl. 74—270)

This invention relates to variable speed power transmitting devices of the complex planetary type and in the form chosen for illustration combines a hydrodynamic device with a complex planetary gear set.

The principal object of this invention is to provide a variable speed ratio power transmitting device suitable for use in vehicles or, in general, wherever varying loads are encountered in which changes in speed ratio are to be effected automatically, wherein the speed ratio controls are of a very simple character such that an ordinary mechanic can readily service the transmission.

Another object of this invention is to combine a hydrodynamic coupling of the vaned type with gearing in such a manner that the coupling is used only under those conditions for which it is best suited. as, for example, for starting a vehicle from a standstill.

Another and important object of this invention is to combine and control two simple planetary gear sets in such a manner as to obtain four usable speeds forward, a definite neutral, and a reverse drive from the combined gear sets.

Another object of this invention is to use, in effect, three separate and distinct speed responsive controls, one of which controls the two highest speed ratios and each of the others controlling another ratio so that the use of complicated controls to correlate the shifts may be avoided.

In the design of automatic transmissions heretofore disclosed, the tendency on the part of the designer has been to select some one form of shifting mechanism, such as the Maybach clutch, the hydraulically operated friction clutch or brake, the mechanically operated friction clutch or brake, the hydrodynamically operated couplings, etc., and to use the selected type of shifting mechanism throughout the entire transmission to obtain all of the necessary ratios. No one type of shifting device, however, is satisfactory for all speed ratios and to start a vehicle in motion from a standstill and hence various compromises and complications have been introduced into the controls of the prior art transmissions to make up for the deficiencies of the type of control selected.

A further object of this invention accordingly is to provide a variable speed transmission which uses a hydrodynamic vaned coupling for one speed, a centrifugally operated friction clutch for another speed, a hydraulically operated jaw clutch of the self-synchronizing or Maybach type for a third speed, a friction brake for a fourth speed and pawls for forward and reverse speeds, each of these devices being used under conditions which are most favorable for its operation.

These and other objects of this invention will become apparent from the following detailed description when taken together with the accompanying drawings in which:

Fig. 1 is a schematic diagram of the transmission and the controls therefor; and Fig. 2 is a fragmentary development of one of the clutches to show the form of the engaging elements.

It will be noted that in the drawings no attempt has been made to show the details of the shafts, bearings, fasteners, retainers, casing, etc. since these are all within the capabilities of one skilled in the art and hence are not necessary for a complete understanding of the invention. The relative locations and sizes of the controls are likewise schematically shown and are not intended to represent the relative locations and sizes which these elements would assume in an actual installation.

Referring now to the drawings for a detailed description of the invention:

A drive shaft 10 is connected to a suitable source of power (not shown), such for example as an internal combustion engine, and 11 is a driven shaft connected to the load. Drive shaft 10 is directly connected to a fly wheel 12 on which is formed a starting gear 13 and which drives a hydraulic coupling 14 of the vaned type. Said hydraulic coupling 14 is connected in series with a one-way clutch 15, a hollow shaft 24, a friction clutch 16 and first and second planetary gear sets 17 and 18, respectively. An automatic centrifugally operated friction clutch 19, a vibration dampening device 20, and an intermediate shaft 66 are connectible in series between planetary gear set 17 and drive shaft 10.

Hydrodynamic device 14 is comprised of an impeller member 21 having the usual radial vanes which energize a fluid and cause the fluid to impinge upon a vaned runner element 22. Impeller 21 also drives a pump 23 of any suitable and well-known variety for the purpose of providing fluid under pressure for operation of certain of the clutches and one of the brakes used in the transmission.

As shown in Fig. 1, runner element 22 is connected directly to overrunning clutch 15 which in turn is connected to hollow shaft 24 at one end of which are mounted two or more friction plates 25 forming the driving elements of friction clutch 16. Said plates 25 are retained between an abutment 26 and axially movable plates 27 and 28 mounted on the driven element of clutch 16, said movable plate 28 being preferably in the form of an annular piston which is received within an annular recess 29 in the driven element 30 of the clutch. For purposes of discussion, abutment 26 may be considered an integral part of driven element 30 of clutch 16.

Said driven element 30 is connected through a second hollow shaft 31 to the sun gear 32 of first planetary gear set 17, said sun gear 32 meshing directly with one or more planet pinions 33 mounted on a carrier 34 and meshing directly with a ring gear 35. Said ring gear 35 is directly connected to driven shaft 11 by means of a plate or spider 36. Carrier 34 is directly connected by means of a drum 37 to the ring gear 38 of second planetary gear set 18. Said ring gear 38 meshes directly with one or more planet pinions 39 mounted on a pinion carrier 40 and meshing directly with a sun gear 41. Said sun gear 41 is mounted on a sleeve 42 which is freely rotatable on driven shaft 11 and on which are formed external teeth 43 forming a part of a toothed brake 44 having a fixed set of teeth 45 and a movable set of teeth 46 engageable with teeth 45 and formed in the end of a slidable collar 47 which is splined to external teeth 43 on sleeve 42. Carrier 40 is connected to rotate with the driven shaft either by means of an individual connection (not shown) or by means of plate 36.

A brake 48 is provided for sun gear 41, said brake 48 comprising a toothed wheel 49 which is connected to sleeve 42 through a suitable one-way connection 50, said connection restraining rotation of sleeve 42 relative to toothed wheel 49 in a direction opposite to that of drive shaft 10 but permitting relative rotation in the same direction as said drive shaft 10. Toothed wheel 49 is adapted to be engaged by one or more teeth of a pawl or sprag 52 which is slidable in an opening 53 in the casing 54 or other fixed portion of the transmission.

Drum 37 is likewise provided with a brake 55 comprised of a toothed ring 56 secured to drum 37 and adapted to be engaged by a toothed pawl or sprag 57 slidable in an opening 58 in a housing 54. Pawls 52 and 57 may be identical in shape and size for interchangeability.

Friction clutch 19 is comprised of a friction plate 59 secured to and rotatable with flywheel 12 and retained between an abutment 60 and a movable pressure plate 61, said plate 61 abutting a plurality of wedge-shaped weights 62 (only one of which is shown) which cooperate with an inclined surface 63 on an opposed abutment 64 rotatable with abutment 60. Said abutments 60 and 64 are mounted on a hub member 65 in which is located the previously mentioned vibration dampening device 20, which in turn is mounted on and rotatable with the intermediate shaft 66, the latter being connected through a spider or a plate 67 with carrier 34.

For one of the speeds hereinafter to be described a clutch 68 is provided to connect carrier 34 with sun gear 32. Said clutch 68 is comprised of a toothed element 69 rotatable with carrier 34 and adapted to be engaged by an axially slidable toothed element 70 mounted in a support 71 which is secured to and rotatable with hollow shaft 31. Said support 71 is provided with an annular recess 72 in which is disposed an annular piston 73 connected to toothed element 70 by means of one or more springs 74. A spring 75 is compressed between an abutment 76 and toothed element 70 so as to keep said toothed element disengaged from toothed element 69. Spring 74 is stronger than spring 75 so that the latter is compressed when the former is energized and there is no obstruction to the movement of element 70.

As shown in Fig. 2, the ends of the teeth on elements 69 and 70 are chamfered so as to resist engagement while element 70 rotates in the same direction as shaft 10 at a greater speed than element 69 but to promote rapid engagement when these conditions are reversed. This type of tooth form is sometimes referred to as the "Maybach" type.

Sun gear 32 may be held against rotation by means of a brake 77 which is comprised of a smooth drum-like surface 78 formed on driven element 30 of clutch 16, and a brake band 79 which is normally applied to surface 78 by means of suitable springs (not shown).

The various speed ratios obtainable through the transmission just described are as follows:

In neutral, brakes 48 and 55 are released, brake 44 is released and brake 77 is applied. All of the two-way clutches are released. Hence the only elements which are connected to drive shaft 10 under these conditions are hydrodynamic coupling 14, one-way clutch 15 and shaft 24. These elements may be rotated at any speed at will without turning any of the other elements of the transmission other than friction plate 59 which, of course, is free to turn and friction plates 25 of clutch 16 which likewise are free to turn.

For forward drive in the lowest ratio, brake 48 is applied so as to arrest the rotation of toothed wheel 49 which in turn, through one-way brake device 50, arrests the rotation of sun gear 41 of second planetary gear set 18. With the operation of brake 48, clutch 16 is engaged by hydraulic controls hereinafter to be described and clutch 68 is permitted to be disengaged by spring 75. The drive is then from shaft 10 and flywheel 12 through coupling 14, one-way clutch 15, shaft 24 and clutch 16 to sun gear 32. The rotation of sun gear 32 causes all other remaining gearing except sun gear 41 to rotate likewise, thereby rotating plate or spider 36 and its associated driven shaft 11. A double reduction will be effected by means of the interconnection between planetary gear sets 17 and 18, the reaction, however, being taken on sun gear 41 and its associated one-way brake 50 and brake 48. It will be noted that hydrodynamic device 14 is used to start the load moving, and because of the smooth characteristics of the hydraulic coupling and the automatic nature of the speed change therethrough from infinity to one-to-one the coupling is ideally suited for this particular ratio. It should be noted that in low gear, carrier 34, spider 67 and intermediate shaft 66 are likewise rotated and gather speed as the driven shaft 11 increases its speed.

For second speed, no movement on the part of the operator is required. The rotation of intermediate shaft 66 and disc 65 will cause the rotation of abutments 60 and 64 together with wedge-shaped weights 62, and upon reaching a predetermined speed said weights 62 will move outward and will move pressure plate 61 toward abutment 60 thereby effecting a driving engagement between disc 59 and hub member 65. When the engagement becomes complete, that is to say, when slip substantially ceases, the drive will then be from drive shaft 10 and flywheel 12 to clutch 19, vibration dampening device 20, intermediate shaft 66, plate 67, carrier 34 and drum 37 to ring gear 38 of the second planetary gear set 18 and its associated pinions 39, carrier 40 and plate 36 and finally to driven shaft 11. Since ring gear 38 will now be turning at a greater speed relative to drive shaft 10 than it did when the drive was through coupling 14, a second and higher speed will be effected. The rotation of carrier 34 at substantially drive shaft speed and the rotation of ring gear 35 at driven shaft speed, which is less than drive shaft speed in second gear, will cause sun gear 32 to be rotated at an overspeed, that is to say, it will rotate faster than drive shaft 10 or runner element 22 of coupling 14. It is to permit such an overrunning condition that one-way clutch 15 is provided. Said clutch 15 transmits the drive only when runner element 22 is the driver, but when shaft 24 tends to rotate ahead of runner element 22 said one-way clutch 15 breaks the connection and permits the shaft 24 to rotate ahead of runner element 22. Thus the shift from low speed to second speed is effected smoothly and automatically without any activity on the part of the operator. It is contemplated that the shift will take place at a relatively slow speed such as five miles per hour.

Since the torque which the operator desires to impart to driven shaft 11 may be quite high in second speed, either for increased acceleration, or to carry a greater load, it is desirable to have the drive a mechanical drive so as to avoid excessive slip such as would occur in a hydrodynamic coupling. It is thus apparent that the automatic friction clutch is ideally suited for this particular ratio.

For direct drive, fluid under pressure is admitted to annular recess 72 of clutch 68 to urge piston 73 toward abutment 76, thereby urging clutch element 70 against clutch element 69. It is contemplated that the fluid pressure will be controlled by a speed responsive device which is associated with driven shaft 11 to respond to the speed of said shaft. While the transmission is in condition for second speed operation, however, as described above sun gear 32 is rotating ahead of carrier 34 so that should the fluid pressure be applied while in second speed, element 70 will tend to engage element 69.

No harm will be done, however, because the direction of the chamfer on the ends of the teeth is such as to permit ratcheting under these conditions. Spring 74, however, will be compressed and energized and when the operator has completed his acceleration and levels off to a steady speed he will unconsciously release the accelerator pedal to reduce the torque developed by the engine. The momentum of the vehicle or load will cause ring gear 35 to move at a relatively constant speed and hence the reduction of the torque produced by the engine will be accompanied by a slowing down of carrier 34 which in turn will be accompanied by a still more rapid slowing down of sun gear 32 so that sun gear 32 will eventually rotate at approximately the same speed as carrier 34 and will in fact tend to reverse its relative direction of rotation and rotate backwardly with respect thereto. When this condition obtains, the teeth on element 70 will be synchronized with the teeth on element 69 and spring 74 will then snap the former into engagement with the latter. This will effect a lock-up of planetary gear set 17, and since ring gear 35 is in effect connected to carrier 40 of planetary gear set 18 and carrier 34 is connected to ring 38 of the said gear set 18, the latter gear set will likewise be locked up so that the entire group of gears will be rotated as a single unit. It will not be necessary to release brake 48 since one-way coupling device 50 is designed to break the connection to brake 48 when the direction of the reaction impressed upon the gearing is reversed. It will be noted that in direct drive, as in second speed drive, hydrodynamic device 14 does not participate in the drive and hence the inefficient slipping under sudden increases in torque, which is inherent in hydrodynamic couplings, will be eliminated.

The top speed is an overdrive, it being contemplated that if the transmission is used in a passenger car vehicle, a rear axle ratio of approximately 4.25 will be used. The shift from direct drive to overdrive is effected by applying brake band 79 and releasing clutches 16 and 68. It is contemplated that fluid pressure in recess 72 (clutch 68) will be reduced prior to the application of brake band 79 so that spring 75 will be ready to snap clutch element 70 out of engagement with clutch element 69 just as a reversal in the direction of torque incident to the application of band 79 takes place. It will be noted that in direct drive ring gear 35 is associated with the driven shaft and constitutes the load or reaction element, carrier 34 is the driving element and sun gear 32 tends to rotate ahead of carrier 34. When brake band 79 is applied sun gear 32 tends to lag behind carrier 34 and hence the direction of torque between clutch elements 69 and 70 reverses and spring 75, having been previously energized, will disengage the clutch elements 69 and 70 and overdrive will then be effected. Thus, in overdrive, clutch 19 remains energized and transmits the torque through intermediate shaft 66, plate 67 and carrier 34 to planet pinions 33. The pinions will roll around stationary sun gear 32 and will drive ring gear 35 at a greater speed than intermediate shaft 66 and drive shaft 10, the greater speed being transmitted to driven shaft 11 through plate 36. In overdrive, as in direct drive, the direction of the reaction on sun gear 41 is in the same direction as the drive so that one-way brake 50 will remain released.

For reverse drive, brake 55 is applied and brakes 44, 48 and 77 are released. Clutch 16 is engaged and clutch 68 is disengaged. The application of brake 55 holds drum 37 and its associated carrier 34, plate 67, intermediate shaft 66, and finally weights 62 of clutch 19 against rotation so that clutch 19 can not engage while the transmission is conditioned for reverse operation. The drive is then from shaft 10 and flywheel 12 through coupling 14, one-way clutch 15, clutch 16 and sun gear 32 to planet pinions 33. Said pinions 33, however, rotate about stationary pinion shafts and hence act as reversing idlers, thereby driving ring gear 35 at a reduced speed in a reverse direction. Said reverse rotation is transmitted through plate 36 to driven shaft 11. The reverse rotation also causes carrier 40 and sun gear 41 of second planetary gear set 18 to rotate reversely, but since brake 48 is not engaged under these conditions said reverse rotation may take place unhindered.

Under certain emergency conditions it is desirable to use the compression of the engine for braking purposes. This, of course, is particularly applicable to trucks and cars, especially when they are about to descend a very steep hill. With a standard shift this is usually done by shifting the transmission to second speed, and if the equivalent effect is to be obtained in the above transmission it must be capable of second speed operation when the shaft 11 is the driver and the shaft 10 is the driven or load shaft. This, however, can not be effected as long as brake 50 releases when the direction of torque reverses and hence a lock-up for one-way brake 50 is provided. This lock-up is the brake 44 which has previously been described and which is a two-way brake. When engaged, sleeve 42 will be held against rotation and hence sun gear 41 will likewise be held against rotation in either direction. With the remaining elements arranged as described for second speed, the vehicle may then coast down the hill, care being taken not to exceed the cut-in speed of the overdrive.

There is one other condition under which a drive must be possible from driven shaft 11 to drive shaft 10. This condition exists when it is desired to start the rotation of an internal combustion engine in a vehicle by pushing the vehicle. In the transmission herein described such a drive is obtained as follows:

It will be remembered that brake band 79 of brake 77 is normally applied by resilient means and is disengaged by power so that when no power is available, as for example when the engine is not running, brake 79 will be applied. Likewise when no power is available clutches 16 and 68 will be disengaged. Thus sun gear 32 is held against rotation by brake 77 and provides a reaction element for planet pinions 33. The forward brake 48 is applied to have the transmission ready for forward drive when the engine begins to turn under its own power. When the vehicle is pushed or towed under these conditions, driven shaft 11 will drive ring gear 35 in a forward direction which in turn will roll planet gears 33 around fixed sun gear 32 thereby carrying with them carrier 34, plate 67, intermediate shaft 66 and finally weights 62. When the speed at which clutch 19 normally engages is reached, a connection will be effected between intermediate shaft 66 and drive shaft 10 thereby turning over the engine as desired. When the engine begins to fire, however, the drive will then be reversed, drive shaft 10 becoming the driver and fluid pressure becoming available to release brake 77 and engage clutch 16 for second speed drive in a forward direction.

Having described the various power transmitting and receiving elements of which the transmission is comprised, the fluid controls for these elements will now be detailed.

The hydraulic controls comprise in general three valves, two of which are identical and are formed in the bodies of the pawls for brakes 48 and 55. Referring now to brake 48, the shank of pawl 52 has a portion 80 of reduced diameter or cross-section so as to form a spool or balanced valve. The end 81 of pawl 52 is enlarged to form a shoulder which cooperates with one leg 82 of a T-shaped lever 83, the stem 84 of which is connected through a suitable linkage 85 to a hand control lever (not shown) under the steering wheel or at some other point on the vehicle readily accessible to the operator. A spring 86 normally tends to engage pawl 52 with toothed wheel 49. Similarly, pawl 57 of reverse brake 55 is provided with a portion 87 of reduced diameter or cross-section to form a spool or balanced valve. The enlarged end 88 cooperates with the opposed leg 89 of T-shaped lever 83, and a spring 90 normally urges pawl 57 into engagement with toothed wheel 56. Lever 83 is pivoted at 91 in housing or casing 54.

Rocking lever 83 about its pivot 91 from the position shown will permit one or the other of the pawls 52 and 57 to engage its corresponding toothed wheel. Only one pawl, however, may be engaged at a time since the rocking of the lever about its pivot forcibly withdraws the opposite pawl from its wheel. In the position shown, neither pawl is in engagement with its wheel and the transmission is in neutral position insofar as brakes 48 and 55 are concerned.

Fluid under pressure is supplied by a pump and a fluid pressure maintaining device shown diagrammatically at 23 and said fluid flows into a conduit 92 which has two branches 93 and 94. Said branch 94 terminates in a conduit 95 located between and connecting pawls 52 and 57. When lever 83 is in its neutral position both outlets of conduit 95 are blocked by the bodies of the pawls. When lever 83 is rocked to its forward position, pawl 52 is moved radially inwardly into engagement with toothed wheel 49 and the right-hand end of conduit 95 is exposed to the portion 80 of reduced cross section of the pawl which is in communication with a conduit 96 conducting the fluid under pressure around portion 87 of reduced cross-section of pawl 57 and thence into a conduit 97. The radial inward movement of pawl 52 closes off a vent conduit 98 so that pressure is preserved in the system.

Conduit 97 has two branches 99 and 100, branch 100 being further divided into a conduit 101 leading to a cylinder 102 in which is a piston 103 the function of which is to operate upon brake band 79 by suitable means (not shown) to release said brake band 79 from contact with brake drum 78. The second branch 104 of conduit 100 conducts fluid under pressure to annular recess 29 of clutch 16 to engage said clutch.

It will be apparent thus far that fluid pressure will be simultaneously available at brake 77 and clutch 16 to release the former and engage the latter whenever the transmission is conditioned for forward drive. This same condition obtains, however, when the transmission is conditioned for reverse drive since in the shift to reverse drive radially inward movement of pawl 57 opens the left-hand portion of pressure conduit 95 to the space around the reduced cross-section 87 of the pawl 57 and thence to conduit 97 which leads to brake 77 and clutch 16.

Annular recess 72 of clutch 68 is in communication with a conduit 105 which has one branch 106 normally blocked off by a valve 107, and a branch 108 which, when valve 107 is in its neutral position as shown in Fig. 1, is in communication through portion 109 of reduced cross-section of valve 107 with a vent conduit 110. Conduit 99 is also blocked off by valve 107 when said valve is in its neutral position. This neutral position of the valve is the position corresponding to neutral, first and second speed conditions of the transmission. Said valve 107 has a stem 111 connected to one end of a floating lever 112 pivoted at 113 to a lever 114 which in turn is pivotally connected to the control 115 for the prime mover. This control 115 may in the case of an automobile be an accelerator pedal. The other end of lever 112 is connected to the movable part 116 of a governor 117 which is preferably driven from the driven shaft 11 or some element which is rotatable at a speed proportionate to the speed of rotation of said shaft. Valve 107 is so proportioned that when a predetermined speed of rotation of driven shaft 11 is reached, governor 117 will move valve 107 to the left as shown in Fig. 1, thereby closing off vent opening 110 and connecting conduit 108 with conduit 93 by means of the portion 109 of reduced cross section of the valve 107, said conduit 93 being a pressure conduit. This is the direct drive position of the valve. This causes fluid under pressure to be conducted into annular recess 72 behind annular piston 73 of clutch 68 to engage said clutch. As previously described, clutch 68 will not be engaged until a relative reversal of drive takes place between toothed elements 69 and 70. The connection with the accelerator pedal renders the movements of valve 107 subject to the joint action of the governor and pedal so that the movements of the valve will be delayed when high torque is required.

Valve 107 has another position in which both conduits 106 and 99 are vented, conduit 106 being vented before conduit 99. The valve 107 in this position is moved to the left as seen in Fig. 1 so that the right end of the valve 107 clears and unblocks the conduits 99 and 106. This is the overdrive position and results in the disengagement of clutches 16 and 68 and the engagement of brake 77.

For reverse, lever 83 is rotated counterclockwise so as to disengage pawl 52 from toothed wheel 49 and engage pawl 57 with its toothed wheel 56. This movement of the pawls closes off conduit 96 and opens pressure conduit 95 to conduit 97 leading to brake 77 and clutch 16. Brake 77 is accordingly released and clutch 16 is engaged, and said drum 37 will be held by toothed wheel 56 of brake 55. Carrier 34 which is secured to drum 37 will likewise be held against rotation as previously described and the reverse drive will be effected.

Since the position of valve 107 is controlled jointly by the position of accelerator pedal 115 and governor 117, should a sudden demand for more torque arise, accelerator pedal 115 will be depressed thereby shifting valve 107 to its next lower position. It is contemplated, of course, that valve 107 will be controlled by suitable detent means (not shown) so that it will move a definite distance and then stop and will not be continually shifting for each slight change in the position of the accelerator pedal or governor. Thus should the sudden demand for increased torque arise while the transmission is conditioned for overdrive, valve 107 will be shifted to its direct drive position, which means that brake 77 will be disengaged, clutch 16 will be engaged and clutch 68 will be engaged. It will be recalled that in overdrive sun gear 32 is stationary and carrier 34 is rotating. Thus toothed element 69 is rotating ahead of toothed element 70 and will engage immediately. It is contemplated that engagement of clutch 68 will take place a brief instant after brake 77 is released as indicated by the relative positions of conduits 99 and 106 at valve 107. Thus sun gear 32 and its associated clutch element will be rotating at the time engagement between teeth 70 and 69 takes place but will not be rotating as fast as carrier 34, and any shock incident to the engagement will be relatively slight.

Should the transmission be conditioned for direct drive and a downshift to second speed be desired, accelerator pedal 115 is again completely depressed, thereby moving valve 107 to its second speed position, as shown in Fig. 1. This removes the pressure from recess 72 behind piston 73 and conditions clutch 68 for release, although release will not take place until torque is relieved on the teeth 69 and 70. This torque release is obtained by moving the accelerator pedal back slightly, but not sufficiently to restore valve 107 to its direct drive position, and then depressing the valve again, the release of the pedal momentarily relieving teeth 69 and 70 of torque and permitting them to be disengaged by springs 75. When the shift back to direct drive is desired the operator simply releases his foot from accelerator 115 which permits valve 107 to assume its direct drive position, thereby readmitting fluid to recess 72 and slowing down sun gear 32 relative to carrier 34 to permit toothed elements 69 and 70 to engage, all as previously described.

Should the operator remain in second speed above the cut-in speed of the overdrive, clutch 68 will not engage at all and upon the movement of valve 107 to its overdrive position, brake 77 will be applied and clutch 16 will be released. In this manner one shift upward may be skipped entirely should the operator so desire.

In recapitulation, the transmission just described utilizes a minimum of gearing to provide four speeds forward, neutral and reverse. A hydraulic coupling is used only for starting purposes where it has been found to be most effective. Second speed drive is effected by means of a mechanical centrifugally operated clutch which when once engaged remains engaged for all of the succeeding speed ratios. Thus this type of clutch is used under conditions most ideally suited for it. The centrifugal clutch is also utilized to provide a connection between the driven shaft and drive shaft when it is desired to start the engine by pushing the vehicle, thus making unnecessary the use of auxiliary devices for this purpose. A governor controlled valve is used only for direct and overdrive ratios and hence is extremely simple in its construction. The shift from direct drive to overdrive and back again to direct drive is accomplished by means of a jaw clutch and brake band, the jaw clutch being recognized as the most efficient form of coupling and the brake band performing the function of arresting the rotation of the sun gear to provide the overdrive ratio and also to reverse the torque on the jaw clutch to permit its release and engagement, thereby making unnecessary the use of electrical ignition interrupting devices such as are commonly used on overdrives.

It is understood that the foregoing description is merely illustrative of a preferred embodiment of this invention and that the scope of the invention is not to be limited thereto but is to be determined by the appended claims.

I claim:

1. A variable speed transmission comprising drive and driven shafts, first and second planetary gear sets each set comprising ring and sun gears, planet pinions meshing with the ring and sun gears and a carrier for the planet gears; means connecting the carrier of the first set with the ring gear of the second set, means connecting the ring gear of the first set with the driven shaft and also with the carrier of the second set, means connecting the carrier of the first set to the drive shaft, releasable means for holding the sun gear of the second set, and selective means operable while the sun gear of the second set is released for either holding the sun gear of the first set against rotation or connecting the said first set sun gear to said first set carrier which is connected to the drive shaft to produce either an overdrive or another drive between the shafts.

2. A variable speed transmission comprising drive and driven shafts, first and second planetary gear sets each set comprising ring and sun gears, planet pinions meshing with the ring and sun gears and a carrier for the planet pinions; means connecting the carrier of the first set with the ring gear of the second set, means connecting the ring gear of the first set with the driven shaft, means connecting the carrier of the second set with the driven shaft, releasable holding means for the sun gear of the second set, an intermediate shaft connected to the carrier of the first set, a clutch for connecting the intermediate shaft to the drive shaft, a hollow shaft concentric with the intermediate shaft and connectible at one end to the drive shaft, and means for selectively connecting the sun gear of the first set to the hollow shaft or for holding the sun gear against rotation to produce either an overdrive or a lesser drive between the shafts.

3. A variable speed transmission as described in claim 1, said means connecting the sun gear of the first set to the carrier of the first planetary gear set comprising a positive clutch having toothed elements of a self-synchronizing type such that engagement of the clutch is automatically prevented until a torque reversal between the said sun gear and drive shaft takes place.

4. A variable speed transmission as described in claim 1, the means for connecting the carrier of the first set to the drive shaft including a clutch and means responsive to the speed of said first set carrier for operating the clutch.

5. A variable speed transmission as described in claim 1, the means for connecting the carrier of the first set to the drive shaft comprising an intermediate shaft connected at one end to the carrier, and a friction clutch for connecting the other end of the intermediate shaft to the drive shaft, said friction clutch being operable in response to a predetermined speed of the carrier.

6. A variable speed transmission comprising drive and driven shafts, first and second differential gear sets each set comprising ring and sun gears, planet pinions meshing with the ring and sun gears and a carrier for the planet pinions; means connecting the carrier of the first set with the ring gear of the second set, means connecting the ring gear of the first set with the driven shaft, means connecting the carrier of the second set with the driven shaft, releasable holding means for the sun gear of the second set, an intermediate shaft connected to the carrier of the first set, a clutch for connecting the intermediate shaft to the drive shaft; a first automatically operable coupling means, an automatically releasable coupling means and a second automatically operable coupling means for connecting the sun gear of the first set to the drive shaft, and means for holding the sun gear of the first set against rotation when the sun gear of the second set is released.

7. A variable speed transmission as described in claim 6, said first automatically operable coupling means being responsive to the speed of the drive shaft and said second automatically operable coupling means being operable when the second sun gear is held.

8. A variable speed transmission as described in claim 6, and means for coupling the sun gear of the first set to the carrier of the first set, said last-mentioned coupling means and the holding means for the said sun gear of the first set being mutually exclusively operable.

9. A variable speed transmission comprising drive and driven shafts, differential gearing connectible between the shafts having a drive element, a driven element and a reaction element; positive clutch means for connecting the drive element to the reaction element to provide a direct drive, friction means for holding the reaction means to produce an overdrive, and means for biasing the clutch means to disengaged position prior to the application of the holding means whereby said clutch means will be in condition to release when the torque load thereon resulting from the direct drive condition will be relieved by the operation of the holding means.

10. A variable speed transmission as described in claim 9, said positive clutch being of the self-synchronizing type and resisting engagement when the reaction element rotates ahead of the driving element.

11. A variable speed transmission comprising drive and driven shafts, planetary gearing connectible between the shafts having a carrier which receives the drive from the drive shaft, planet pinions mounted on the carrier, sun and ring gears meshing with the pinion gears, said ring gear being connected to the driven shaft, positive clutch means for connecting the sun gear to the carrier, a friction brake for arresting the rotation of the sun gear, resilient means constantly biasing the positive clutch to disengaged position and means for mutually exclusively engaging the clutch and brake, said last named means being adapted to condition the positive clutch for release by its resilient means prior to the engagement of the brake whereby to effect a torque reversal and permit the resilient means to disengage the clutch.

12. A variable speed transmission comprising drive and driven structures, differential gearing connectible between the structures having a drive element, a driven element and a reaction element; positive clutch means for connecting the drive element to the reaction element to provide a direct drive, an auxiliary power path including a shaft connected with the drive structure, friction clutch means for connecting the reaction element to said shaft for an underdrive, friction means for holding the reaction elements to produce an overdrive, and means for biasing the positive clutch means to disengaged position and means for releasing the friction clutch means and engaging the holding means to establish an overdrive ratio, said biasing means becoming effective before the holding means, whereby said positive clutch means will be in condition to release when the torque load thereon resulting from the direct drive condition will be relieved by the operation of the holding means.

13. A variable speed transmission comprising drive and driven shafts; first and second planetary gear sets, each set comprising ring and sun gears, planet pinions meshing with the ring and sun gears and a carrier for the planet gears; means connecting the carrier of the first set with the ring gear of the second set; means connecting the ring gear of the first set with the driven shaft and also with the carrier of the second set; means connecting the carrier of the first set to the drive shaft; releasable means for holding the sun gear of the second set; and selective means operable while the sun gear of the second set is released for either holding the sun gear of the first set against rotation or connecting the said first set sun gear to said first set carrier to produce either an overdrive or another drive between the shafts, said means connecting the sun gear and the carrier of the first planetary gear set comprising a positive clutch.

14. A variable speed transmission comprising drive and driven shafts; first and second planetary gear sets, each set comprising ring and sun gears, planet pinions meshing with the ring and sun gears and a carrier for the planet gears; means connecting the carrier of the first set with the ring gear of the second set; means connecting the ring gear of the first set with the driven shaft and also with the carrier of the second set; means connecting the carrier of the first set to the drive shaft; releasable means for holding the sun gear of the second set; selective means operable while the sun gear of the second set is released for either holding the sun gear of the first set against rotation or connecting the said first set sun gear to said first set carrier to produce either an overdrive or another drive between the shafts; an element moving at a speed proportionate to the speed of said driven shaft; and means controlled by the speed of said element for operating the selective means.

15. A variable speed transmission comprising drive and driven shafts; first and second differential gear sets connected between said shafts, each gear set comprising ring and sun gears, planet pinions meshing with the ring and sun gears and a carrier for the planet pinions; means connecting the carrier of the first set with the ring gear of the second set; means connecting the ring gear of the first set with the driven shaft; means connecting the carrier of the second set with the driven shaft; releasable holding means for the sun gear of the second set; an intermediate shaft connected to the carrier of the first set; a clutch for connecting the intermediate shaft to the drive shaft; a first automatically operable coupling means; an automatically releasable coupling means; a second automatically operable coupling means for connecting the sun gear of the first set to the drive shaft; means for holding the sun gear of the first set against rotation when the sun gear of the second set is released; means for coupling the sun gear of the first set to the carrier of the first set; an element rotatable at a speed proportionate to the speed of the driven shaft; and means responsive to the speed of said element for operating the last mentioned sun gear coupling means and the holding means for the sun gear of the first set.

16. A variable speed transmission adapted to provide neutral, low, second, direct and overdrive speed ratios and comprising drive and driven shafts; a plurality of intermeshing gear means connected between said shafts; and control means for said intermeshing gear means comprising a brake applied to one of the gear means during low and second speed ratios, a clutch connecting a second gear means to the drive shaft for low speed ratio, a second clutch connecting a gear carrier means with the drive shaft for second speed ratio, a third clutch for connecting said second gear means and said gear carrier means to the drive shaft for direct speed ratio, and a second brake applied to said second gear means for overdrive speed ratio; manually operated means for operating the first named brake; power operated means for operating the clutches for low and direct speeds and for operating the brake for overdrive speed; and control means for the power operated means, said control means causing the power means to engage the low speed clutch and disengage the overdrive brake when the brake for low and second speed is operated, and causing the power operated means to operate the direct drive clutch, said second speed clutch being independent of the power operated means.

17. A variable speed transmission as described in claim 16, including resilient means for engaging the overdrive brake and disengaging the direct drive clutch, said second speed clutch being also effective to transmit the drive when the transmission is conditioned for overdrive ratio.

18. A variable speed transmission as described in claim 16, said second speed clutch being energized by the rotation of the said gear carrier means.

19. A variable speed transmission as described in claim 16, said control means for the direct and overdrive speed ratios including a governor driven by an element rotatable at a speed proportionate to the speed of rotation of the driven shaft.

20. A variable speed transmission adapted to provide neutral, low, second, direct and overdrive speed ratios and comprising drive and driven shafts; first and second differential gear sets, each set comprising ring and sun gears, planet pinions meshing with the ring and sun gears and a carrier for the planet pinions; means connecting the carrier of the first set with the ring gear of the second set; means connecting the ring gear of the first set with the driven shaft; means connecting the carrier of the second set with the driven shaft; releasable holding means for the sun gear of the second set; and control means for the gearing comprising a brake for the sun gear of the second set applied during low and second speed ratios, a clutch connecting the sun gear of the first set with the drive shaft for low speed ratio, a clutch connecting the carrier of the first set with the drive shaft for second speed ratio, an intermediate shaft and a clutch connecting the sun gear of the first set and the carrier of the first set to the drive shaft for direct speed ratio, and a brake applied to the sun gear of the first set for overdrive speed ratio; manually operated means for operating the first-named brake; power operated means for operating the clutches for low and direct speeds and for operating the brake for overdrive speed; and control means for the power operated means, said control means causing the power means to engage the low speed clutch and disengage the overdrive brake when the brake for low and second speeds is operated, and causing the power operated means to operate the direct drive clutch, said second speed clutch being independent of the power operated means.

21. A variable speed transmission as described in claim 20 including resilient means for engaging the overdrive brake and disengaging the direct drive clutch, said second speed clutch being also effective to transmit the drive when the transmission is conditioned for overdrive ratio.

22. A variable speed transmission as described in claim 20, said second speed clutch being energized by the rotation of the said carrier of said first gear set.

23. A variable speed transmission as described in claim 20 said control means for the direct and overdrive speed ratios including a governor driven by an element rotatable at a speed proportionate to the speed of rotation of the driven shaft.

CHARLES F. VOYTECH.

REFERENCES CITED

The following references are of record in the file of this patent:

UNITED STATES PATENTS

| Number | Name | Date |
|---|---|---|
| 2,162,785 | Neracher | June 20, 1939 |
| 2,251,625 | Hale | Aug. 5, 1941 |
| 2,159,427 | Dunn | May 23, 1939 |
| 2,238,746 | Neracher | Apr. 15, 1941 |
| 2,329,724 | Maurer | Sept. 21, 1943 |
| 1,899,401 | Starr | Feb. 28, 1933 |
| 2,224,322 | Sinclair | Dec. 10, 1940 |
| 2,229,336 | Neracher | Jan. 21, 1941 |
| 2,008,231 | Vincent | July 16, 1935 |
| 2,120,104 | Livermore | June 7, 1938 |